3,528,939
WATER DISPERSIBLE HALF ESTERS OF STYRENE-MALEIC ANHYDRIDE COPOLYMERS WITH N-HYDROXY ALKYL AMIDES OF UNSATURATED FAT ACIDS
Richard J. Pratt, Flossmoor, Roger H. Jansma, Harvey, and Robert J. Conboy, Rockford, Ill., assignors to Sinclair Research, Inc., New York, N.Y., a corporation of Delaware
No Drawing. Filed Jan. 22, 1968, Ser. No. 699,299
Int. Cl. C08f 27/12
U.S. Cl. 260—29.6
13 Claims

ABSTRACT OF THE DISCLOSURE

Partial esters of low molecular weight polymers of an alpha, beta-ethylenically unsaturated dicarboxylic acid and a vinyl benzene hydrocarbon, preferably styrene-maleic anhydride polymers, and an alkanolamide of an ethylenically-unsaturated, long chain, drying fatty acid, such as the ethanolamide of soya drying fatty acid, are obtained with unesterified salt-forming carboxyl groups. These partial esters of about 25 to 100% half-ester, and preferably about 75 or even 90 up to 100% half-ester, are water dispersible and air-drying. Coating compositions are obtained by dispersing these air drying, partial esters in water containing ammonium hydroxide and, at least with the higher esterified products, an organic co-solvent, such as ethylene glycol monobutyl ether. A water-dispersible metal drier can be added and a pigment, such as titanium dioxide, may be added if desired. Coatings are obtained which have excellent air-drying ability to hard, tough films which are unaffected by xylene, and show essentially no deterioration in water or alkali.

This invention relates to water-dispersible, air-drying polymers and to aqueous air-drying compositions. More particularly, this invention relates to water-dispersible, air-drying copolymers containing ethylenically-unsaturated drying fatty acid groups and salt-forming carboxyl groups and to aqueous coating compositions containing said copolymers dispersed therein.

The need for water-based vehicles was provided by postwar needs for automation of finishing methods and for elimination of fire and health hazards. Passage of local ordinances for controlling organic solvent emission and the commercial application of electrophoretic coating techniques have done much to spur interest in these systems. Among important criteria for commercial acceptance of a water-dispersible, air-drying coating composition are dispersion stability, dilutability with water, ease of preparaton, adhesion to surfaces, film resistance to water and alkali, and air-drying ability. A number of alkyd reaction products made from air-drying vegetable acids, styrene-maleic anhydride copolymers and glycols have not been useable as water-dispersible, air-drying products.

In accordance with the present invention there are provided water-dispersible, air-drying partial esters of low molecular weight polymers of an alpha, beta-ethylenically unsaturated dicarboxylic acid and a vinyl benzene hydrocarbon, preferably styrene-maleic anhydride copolymers which are esterified in the range of about 25 to 100% half-ester with hydroxy amides of ethylenically-unsaturated, long chain, drying fatty acids. These half-esters have remaining unesterified groups which are salt-forming carboxyl groups. The anhydride copolymers prior to esterification, have a molar ratio of polymerized vinyl benzene hydrocarbon to polymerized anhydride of about 1:1 to 5:1 and an average molecular weight of about 500 to 5000. Coating compositions are provided by dispersions of these half-esters in water containing ammonium hydroxide and, at least with the higher esterified products, an organic co-solvent, preferably ethylene glycol monobutyl ether. These aqueous systems when catalyzed with a conventional water-dispersible, air-drying catalyst, such as a water-dispersible metal paint drier, e.g. the oxides, resinates, naphthenates, oleates, acetate or other salts of cobalt, manganese or lead, afford cured films with outstanding toughness, air-drying ability, solvent-resistance and alkali-resistance. A great advantage of these water-based paint compositions is the ready clean-up of brushes and other appliances, such as paint buckets used in applying these water-based paints.

Alpha, beta-ethylenically unsaturated dicarboxylic acids and vinyl benzene hydrocarbons, such as styrene and maleic anhydride, can be polymerized to form polymers for use in this invention by conventional polymerization methods. Solution polymerization methods can be employed where the monomers are polymerized in a suitable solvent using as a polymerization catalyst a free-radical catalyst such as a peroxide, preferably benzoyl peroxide, dicumyl peroxide or an alkyl peroxy dicarbonate, at a temperature of about 75° to 300° C. or more. Suitable solvents include the aromatic hydrocarbon solvents, such as cumene, p-cumene, xylene, toluene, etc. Other suitable solvents are the ketones, such as methylethylketone. A preferred manner of carrying out the polymerization is by what is known as incremental feed addition. By this method the monomers and catalysts are first dissolved in a portion of the solvent in which the polymerization is to be conducted and the resulting solution fed in increments into a reactor containing solvent heated to reaction temperature, usually the reflux temperature of the mixture.

When an aromatic solvent is employed as the solvent for the polymerization, the formation of the polymer causes a heterogeneous system, the polymer layer being the heavier layer and recoverable by merely decanting the upper aromatic solvent layer and drying. On the other hand, when a ketone is the solvent, the formed copolymer is usually soluble in the solvent media so that recovery of the product necessitates a solvent-stripping operation. The polymer contains a molar ratio of polymerized vinyl benzene hydrocarbon or styrene to polymerized anhydride of about 1:1 to 5:1, and preferably about 1:1 to 2:1, depending on the molar proportions of the monomers employed in the polymerization. The average molecular weight of the polymers can be about 500 to 5000, preferably about 1000 to 2500, and more preferably within the range of about 1400 to 1800. The polymers containing a molar ratio of styrene to maleic anhydride of about 1:1 to 2:1 are most preferred with molecular weights of about 1400 to 1800.

While polymers of styrene and maleic anhydride are preferred for use in this invention, other polymers of polymerizable vinyl benzene hydrocarbons, preferably of up to eleven carbon atoms, and alpha, beta-ethylenically unsaturated dicarboxylic acids or anhydrides may be used. Thus vinyl benzene hydrocarbons such as vinyl toluene, as well as styrene, may be used. Examples of alpha, beta-ethylenically unsaturated dicarboxylic acids and anhydrides are fumaric acid, itaconic (methylene succinic), citraconic (methyl maleic) and mesaconic (methyl fumaric) acids and anhydrides as well as maleic and substituted maleic acids and anhydrides.

The hydroxyamide or alkanolamide used for preparing the half-esters is a hyroxyamide or alkanolamide of an ethylenically-unsaturated, long chain fatty drying acid. The alkanolamide can be produced by heating at a temperature of about 120 to 170° C. for about 2 to 6 hours, and preferably at about 140–160° C. for about 4 to 5 hours, a hydroxyamine or an alkanolamine with an ethylenically-unsaturated, long chain fatty drying acid or ester. The ester may be the natural oils or of synthetic nature. The various long chain, ethylenically-unsaturated fatty acids or esters having air-drying properties can be used. The esters include the drying, including semi-drying, oils (e.g. linseed oil, hempseed oil, poppyseed oil, tung oil, soya bean oil, etc.). Examples of ethylenically-unsaturated, long chain fatty drying acids are soya fatty acids, tall oil fatty acids, linseed fatty acids, castor oil and dehydrated castor oil fatty acids, tung oil fatty acids, safflower oil fatty acids and oiticica fatty acids. Also, oils or esters derived from these long chain, unsaturated fatty acids constitute useful reactants for this invention. These oils and acids contain ethylenic unsaturation, often with multiple ethylenic double bonds, such as linoleic and linolenic acids of 18 carbon atoms. Soya fatty acids are a commercial product and may contain about 52% linoleic, 22% oleic, 12% linolenic, 11% palmitic and 3% stearic acids.

The hydroxyamine or alkanolamine is most preferably ethanolamine. However, other alkanolamines can be used, such as propanolamine, isopropanolamine, butanolamine and also ether derivatives of ethanolamine, such as diglycolamine. The amines often have about 2 to 28, preferably about 2 to 12, carbon atoms. The preferable alkanolamines can be represented by the formulas:

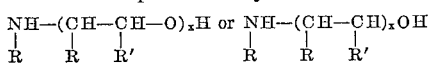

wherein R and R' are hydrogen, alkyl, such as lower alkyl, or phenyl, and $x$ is 1 or 2. There can also be used hydroxy primary or secondary amines of the formula:

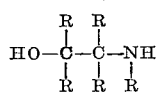

wherein the R's are hydrogen, alkyl, aromatic, olefinic, saturated cyclic, heterocyclic, ethereal, or sulfidyl.

The reaction between the ethylenically-unsaturated, long chain drying acid and ethanolamine can be represented as follows:

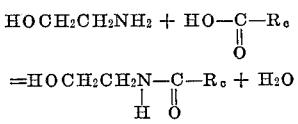

where $R_c$ is the ethylenically-unsaturated, long chain, air-drying moiety of the fatty acid.

In a prepared embodiment the alkanolamide is prepared by heating a mixture of soya fatty acids and ethanolamine. At about 140–160° C. the thick heavy salt that is initially formed is rapidly liquified. During this period water is azeotropically distilled from the reactor. The formation of non-hydroxyl side reaction products is minimized by not forcing the amidation to completion.

The partial esterification of the styrene-maleic anhydride copolymer with the hydroxyamide of the ethylenically-unsaturated, long chain fatty drying acid to at least about 25% half-ester, and preferably about 75 or even 90 to 100% half-ester, can be carried out in any conventional manner. The temperature for the esterification can be within the range of 130–170° C. for 1 to 3 hours, and is preferably no higher than about 150° C. for about 2 to 2½ hours. At higher temperatures there is the possibility of side reactions and imide formation which prevents formulation into acceptable dispersions.

The degree of esterification should be in the range of about 50 to 100% half-ester and preferably about 75% to 100% half-ester, to obtain the required air-drying behavior and salt-forming ability which determines the ease of dispersibility. Lower levels of half ester can given rise to instability problems and loss of water and alkali resistance. The isolation of the half-ester is not recommended because of transfer loss and subsequent solubilizing difficulty in making up the dispersions. For these reasons a concentrate is preferably prepared immediately after the reaction period is completed. Generally, enough organic co-solvent, such as ethylene glycol monobutyl ether, can be added to afford up to about 75–80% nonvolatile material. These concentrates can then be used in making the aqueous dispersions.

The half-ester is often about 25 to 50%, and preferably 30 to 40%, by weight of the coating composition. The amount of water is often about 25 to 50% or more, and preferably 40% to 50% by weight of the coating composition. The amount of base, such as ammonium hydroxide, is often about 2 to 5% by weight of the coating composition, and sufficient to solubilize the half-ester. The function of the base is to form a salt with the carboxyl groups of the half-ester and to solubilize it. Instead of, or in addition to, ammonium hydroxide, a basic amine may be used. An alkylamine, such as a tertiary alkylamine, e.g. trimethylamine or other lower alkylamine, or an alkanolamine, e.g. ethanolamine, may be used to improve brushability and leveling.

The co-solvent is often about 10 to 30% by weight of the coating composition and produces a homogeneous dispersion by compatibilizing the half-ester with water and making further dilutability in water possible. The preferred co-solvent or coupling agent is butyl "Cellosolve" $C_4H_9O$—$CH_2CH_2OH$. However, other organic, usually oxygen-containing, co-solvents can be used, such as ether alcohols, e.g. butyl "Carbitol," and ester alcohols, e.g. "Cellosolve" acetate, which are slow drying and also alcohols, such as propyl alcohol which is fast drying. The ingredients and their properties making up the dispersion may be varied according to the performance characteristics desired. A drying catalyst is usually employed and, if desired, a pigment, such as titanium dioxide, may be added to the coating composition.

Aqueous coating composition dispersions of this invention perform exceptionally well in tests on stability, dilutability, rate of air drying and thoroughness of cure. Air dried catalyzed clear films from aqueous dispersions of the preferred coating compositions of this invention were found to be tougher, harder, more water and alkali resistant, and of lighter color than a premium type commercial product used for comparison. The aqueous dispersions of this invention can be used in varnishes, permanent inks, clear wood finishes, house paints, industrial baking finishes, metal and wood primers, caulks, putties, cement sealers, waterproofing agents, automotive undercoating, dispersed asphaltic sealants and as vehicle modifiers.

EXAMPLE A

As a standard of comparison (SC) there was used a commercial styrene-allyl alcohol copolymer ester of soya fatty acids which is reacted with a small amount of maleic anhydride. The styrene-allyl alcohol copolymer has an average molecular weight of around 1600 and an equivalent weight of 300±15. When this copolymer is heated with soya fatty acids an ester is formed. This ester undergoes reaction (maleinization) with maleic anhydride at allylic positions and at conjugated double bonds (Diels Alder) resulting in an alkali soluble adduct. However, since the quantity of maleic anhydride used is small, a co-solvent such as butyl "Cellosolve" (ethylene glycol monobutyl ether) is used to afford a clear, homogeneous dispersion. The adduct usually has an acid number of about 63 while the theoretical value is calculated as 104. A typical dispersion of this adduct has the following composition:

| | Percent |
|---|---|
| Maleinized ester | 33 |
| Butyl "Cellosolve" (ethylene glycol monobutyl ether) | 15 |
| Ammonium hydroxide | 4 |
| Water | 48 |
| Total | 100 |

The following examples further illustrate this invention and include preferred embodiments thereof.

EXAMPLE I

Preparation of hydroxyethylamide of soya fatty drying acid

Two-hundred eighty-five grams (1.00 mole) of soya fatty acid and 50 g. of xylene are heated to 60° C. with stirring. A three-necked round bottom flask equipped with stirrer, inlet for nitrogen, Dean Stark trap, and dropping funnel is used. To this mixture of soya fatty acid and xylene, 61.7 g. (1.01 mole) of ethanolamine is added rapidly in one portion with rapid stirring. The dropping funnel is then replaced with a thermometer. The temperature is raised rapidly to 134° C., at which point water and xylene begins to distill. The temperature is slowly raised from this point to 162±5° C. and held there until 85–90% of the theoretical water is distilled. The time for reaction is between 4 and 5 hours. The Dean Stark trap is emptied, the heat is removed and a 30 mm. vacuum applied to the flask for 10–15 minutes. In this manner the remaining xylene is removed from the flask using the trap as a collector. The hydroxyethyl soyamide while still molten is poured into a large jar and capped for later use. The product is analyzed for ethanolamine by the Base No. to pH 4.0 method, for fatty acid by non-aqueous titration with potassium hydroxide, and for hydroxyl number by titration of unreacted acetylating reagent with base. The results are reported in mg. of potassium hydroxide per gram of sample.

Three preparations of hydroxyethylamide of soya fatty drying acid were made from 285 g. soya acid (AN 200±5) and 61 g. ethanolamine in accordance with the general procedure of this example and designated Series I, II and III, respectively. Data in Tables I and II show the preparation and analytical results of these three preparations.

TABLE I.—HYDROXYETHYL SOYAMIDE PREPARATIONS

| | Reaction | | Water collected percent of theo. | Analyses [1] | | |
|---|---|---|---|---|---|---|
| Series | Time, hrs. | Temperature, ° C. | | Acid No., AI | Base No., pH 4 | Hydroxyl Number |
| I | 4½ | 134–165 | 102 | 0.0 | 5.6 | 160.4 |
| II | 4⅔ | 137–167 | 100 | 5.3 | 4.5 | 147.4 |
| III | 4½ | 147–162 | 95 | 17.8 | 13.7 | 165.4 |

[1] Reported as milligrams of potassium hydroxide per gram of sample.

NOTE: 61 g. ethanol amine; 285 g. soya acid (AN 200 ±5).

TABLE II.—HYDROXYETHYL SOYAMIDE COMPOSITIONS BASED ON ANALYTICAL RESULTS

| Series | Ethanolamine, percent | Fatty acid, percent | Equivalent wt. | | Neutral product percent | Hydroxyethyl soyamide, percent |
|---|---|---|---|---|---|---|
| | | | Uncorrected | Corrected | | |
| I | 0.6 | 0.0 | 349 | 376 | 13 | 86 |
| II | 0.5 | 2.7 | 380 | 377 | 11.7 | 84.6 |
| III | 1.5 | 9.1 | 338 | 322 | 0 | 81.4 |

Preparation of hydroxyethyl soyamide half-ester of styrene-maleic anhydride copolymer A four-necked flask fitted with stirrer, nitrogen inlet, Dean Stark trap, and thermometer is charged with 1.0 equivalent of styrene-maleic anhydride copolymer, 1.0 mole of hydroxyethyl soyamide and 150 grams of xylene. The mixture is stirred and heated at 145–150° C. for 2 to 2½ hours. A sample is removed and analyzed for acid number by dissolving a small sample in organic solvent, adding an excess of alkali, and after ten minutes titrating the excess alkali with standardized acid (TBC method for acid number).

According to this procedure by adjustment of the mole equivalents there were prepared with Series I hydroxyethyl soyamide 100%, 75% and 50% half-esters of the following four styrene-maleic anhydride copolymers.

| Styrene maleic anhydride copolymer | A | B | C | D |
|---|---|---|---|---|
| Mole ratio, styrene to maleicanhydride | 1:1 | 2:1 | 3:1 | 1:1 |
| Equivalent weight | 222 | 306 | 438 | 248 |
| Molecular weight, approximate | 1,450–1,600 | 1,650–1,700 | 1,600–1,900 | 600–7 |

With styrene-maleic anhydride copolymer A, a small quantity of methyl ethyl ketone was added to maintain homogeneity of the reaction mixture during the esterification reaction.

With Series II hydroxyethyl soyamide, there were prepared according to this procedure hydroxyethyl soyamide 100% half-esters of styrene-maleic anhydride copolymers A, B, and C, and hydroxyethyl soyamide 80% half-esters of styrene-maleic anhydride copolymers A and C.

With Series III hydroxyethyl soyamide, there were prepared according to this procedure hydroxyethyl soyamide 100% half-esters of styrene-maleic anhydride copolymers A and B and hydroxyethyl soyamide 80% half-ester of styrene-maleic anhydride copolymer A. The 75% level of esterification was raised to 80% for Series II and III to make the reaction mixture more homogeneous.

With Series II and III hydroxyethyl soyamide, there was added to the freshly prepared half-esters, ethylene glycol monobutyl ether (butyl "Cellosolve") in an amount equal to about one-fourth the weight of the charge. Thus a 75–80% concentrate of the half-ester in ethylene glycol monobutyl ether is prepared. The well stirred mixture is cooled slightly and poured into a container which is flushed with nitrogen and sealed tightly until used.

Generally, acid numbers are obtained on the "neat" half ester resin. The results of acid number analyses on Series II and III half-esters, as shown in Table III, not only show generally good agreement with the theoretical values but also indicate the reproducibility between reactions.

TABLE III.—ACID NUMBERS FOR SERIES II AND SERIES III HALF-ESTERS

| | Styrene-maleic anhydride copolymer | Ester level percent half-ester | Acid Number | |
|---|---|---|---|---|
| | | | Exp. | Theor. |
| Series: | | | | |
| II | A | 100 | 85.0 | 93.3 |
| III | A | 100 | 90.7 | 93.3 |
| II | A | 80 | 120.0 | 128.3 |
| III | A | 80 | 128.8 | 128.3 |
| II | B | 100 | 77.0 | 81.9 |
| III | B | 100 | 70.4 | 81.9 |
| II | C | 100 | 90.7 | 68.6 |
| II | C | 80 | 128.8 | 90.8 |

EXAMPLE II

Water dispersible coaoting compositions of Series I

The "neat" hydroxyethyl soyamide half-ester of styrene-maleic anhydride copolymers of Series I were treated hot with butyl "Cellosolve" (ethylene glycol monobutyl ether) as co-solvent, ammonia, and water in alternating incremental additions. In this way the optimum requirements for water and co-solvent were found. The 50% half-ester of styrene-maleic anhydride copolymer B could be formulated without a co-solvent.

Table IV illustrates coating compositions arising from this procedure. A syrene-allyl alcohol maleinized soya ester was also prepared and dispersed in accordance with the general procedure of Example A and included for comparison.

The results indicate the higher degrees of esterification require the greatest amounts of butyl "Cellosolve." Viscosity appears to be a function of ester level and butyl "Cellosolve" concentration. The lower ester levels also exhibited the greatest tendency toward pH instability. Esters from styrene-maleic anhydride copolymers A and B exhibited significant phase separation at the higher degrees of esterification. However, the instability noted here was attributed to the manner in which the dispersions were prepared. The esters of Series II and III which follow later show significant improvements in stability when they were used as "concentrates" in butyl "Cellosolve."

The styrene-maleic anhydride copolymer soyamide half esters in general gave tougher films than the commercial product, the styrene-allyl alcohol copolymer soya ester-maleic anhydride adduct. After two weeks the higher esterification levels also afforded the best xylene resistance.

TABLE V.—PERFORMANCE OF AIR DRIED FILMS OF STYRENE-MALEIC ANHYDRIDE COPOLYMER SOYAMIDE HALF-ESTERS DISPERSIONS (SERIES I)

| Styrene-maleic anhydride copolymer | Half-ester, Percent | Initial appearance | Drawdown leveling | Hardness of 1 week | Films [1] 2 weeks | Xylene rub [2] after 2 weeks |
|---|---|---|---|---|---|---|
| A | 100 | Haze | Excellent | 2B–3B | B | Slightly marred. |
|  | 75 | do | Good | 5B | B | Do. |
|  | 50 | do | Fair | Brittle | 5B | Do. |
| B | 100 | do | do | 5B | B–HB | Do. |
|  | 75 | do | Excellent | 4B | B | Completely removed. |
|  | 50 | do | do | 3B | 3B | Do. |
| C | 100 | do | Fair | 5B | HB | Slightly marred. |
|  | 75 | do | do | 2B–B | HB | Do. |
|  | 50 | do | Poor | Brittle | Completely removed. |
| D | 100 | do | Good | 5B | 3B | Do. |
|  | 75 | do | Fair | 5B | 3B | Do. |
|  | 50 | Clear | Good | 4B | HB | Do. |
| SC [3] | | do | Excellent | 5B | 3B | Do. |

[1] Catalyzed with 0.06% cobalt.
[2] Fifty passes against the film surface with a xylene dampened towel.
[3] Styrene-allyl alcohol copolymer soya ester-maleic anhydride adduct.

EXAMPLE III

Water-dispersible coating compositions and air-drying performance (Series II)

The five best systems were tested further using the second preparation of soyamide (Series II). These systems included hydroxyethyl soyamide 100% half esters of styrenemaleic anhydride copolymers A, B and C and hydroxyethyl soyamide 80% half esters of styrene-maleic anhydride copolymers A and C. "Concentrates" were made by adding enough butyl "Cellosolve" to freshly prepared half-esters to make 75–80% NVM (non-volatile material). This produced significant improvements in dispersibility and final appearance of the dispersions.

TABLE IV.—STYRENE-MALEIC ANHYDRIDE COPOLYMER SOYAMIDE HALF-ESTERS DISPERSION (SERIES I)

| Styrene-maleic anhydride copolymer | Ester level | Dispersion composition [1] | | | | Gardner color, 1953 series | Viscosity sec. | | Initial pH | 36 days |
|---|---|---|---|---|---|---|---|---|---|---|
| | | Butyl "Cellosolve" | Water | Ammonium hydroxide | NVM | | Initial | 36 days | | |
| A | 100 | 21.0 | 42.0 | 4.4 | 32.6 | 8 | 11 | (²) | 9.1 | 8.8 |
|  | 75 | 17.0 | 44.0 | 5.6 | 33.4 | 11 | 67 | (²) | 9.2 | 8.9 |
|  | 50 | 5.8 | 58.0 | 6.8 | 29.4 | 5 | 122 | (²) | 9.2 | 8.7 |
| B | 100 | 41.0 | 22.0 | 4.4 | 32.6 | 8 | 2.2 | (²) | 9.6 | 9.4 |
|  | 75 | 12.3 | 47.0 | 7.9 | 32.8 | 9 | 133 | ³157 | 9.7 | 9.6 |
|  | 50 | None | 60.0 | 6.6 | 33.4 | 6 | 1,800 | 1,800 | 9.2 | 8.5 |
| C | 100 | 37.0 | 22.0 | 7.8 | 33.2 | 5 | 5.0 | 5.0 | 9.4 | 9.5 |
|  | 75 | 16.5 | 41.0 | 7.0 | 35.5 | 10 | 280 | 302 | 9.1 | 9.3 |
|  | 50 | 8.0 | 49.0 | 9.1 | 33.9 | 7 | 1,800 | 1,800 | 9.6 | 9.4 |
| D | 100 | 14.0 | 46.0 | 5.0 | 35.0 | 10 | 8.7 | 8.6 | 9.8 | 9.2 |
|  | 75 | 11.0 | 51.0 | 4.4 | 33.6 | 8 | 9.8 | 10.0 | 9.4 | 9.1 |
|  | 50 | 12.0 | 50.0 | 4.4 | 33.6 | 10 | 5.8 | 6.0 | 9.1 | 7.9 |
| SC⁴ | | 15.4 | 47.0 | 4.2 | 33.7 | 7 | 386 | 311 | 9.0 | 8.9 |

[1] Values reported as weight percent.
[2] Phase separation.
[3] Cloudy.
[4] Standard of comparison, styrene-allyl alcohol copolymer soya ester-maleic anhydride adduct.

Air-drying performance of water-dispersible coating compositions of Series I

The coating composition dispersions of Series I were catalyzed with a cobalt drier and allowed to age for one day before drawing them down on glass plates. The drawdowns exhibited good air-drying characteristics. Table V summarizes the observations made while solvent evaporated and air-drying proceeded. Hazing of the film while the solvent evaporates is an indication of incompatibility in the changing solvent composition. This can be corrected by adding either a higher boiling co-solvent or a less volatile salt forming base or both.

Usually the pencil hardness after one day is 5–6B on all of these films. From this point on the inherent air drying ability and nature of the base resin plays dominant roles in developing well cured film.

Table VI shows the results of these tests. Improvements in color, dispersion composition, and air-drying ability were noted as shown by the results in Table VI. Immersion tests in water and in tetrasodium pyrophosphate solution were also carried out. The hydroxyethyl soyamide 100% half-esters of styrene-maleic anhydride copolymers A and B showed a very high degree of resistance to water and alkali; there were no signs of spotting or clouding throughout the duration of the tests. The superior xylene resistance matched the performance of the earlier tests with Series I. However, the film from the styrene-allyl alcohol copolymer soya ester-maleic anhydride adduct dispersion became rapidly affected and showed progressive signs of spotting, swelling, wrinkling and finally peeling from the glass surface.

TABLE VI.—STYRENE-MALEIC ANHYDRIDE COPOLYMER SOYAMIDE HALF-ESTERS DISPERSIONS AND AIR DRYING PERFORMANCE (SERIES II)

| Styrene-maleic anhydride copolymer | Half-ester level, percent | Composition of dispersion | | | | Gardner color | pH | Vis [1] | Catalyzed [2] | | Xylene rub [3] | Immersion | |
|---|---|---|---|---|---|---|---|---|---|---|---|---|---|
| | | NVM | Butyl "Cellosolve" | Water | Ammonium hydroxide | | | | 3 days | 4 days | | Water [4] | TSPP [5] |
| A | 100 | 33.0 | 9.9 | 52.8 | 4.3 | 6 | 9.0 | 15 | 4B–5B | 3B | NE | NE | NE |
| | 80 | 33.0 | 20.6 | 43.1 | 3.3 | 5 | 9.1 | 297 | 3B | B | NE | Coating peeled | |
| B | 100 | 34.0 | 20.3 | 42.2 | 3.5 | 6 | 9.1 | 31 | 3B–4B | 3B | NE | NE | NE |
| C | 100 | 33.7 | 25.6 | 37.3 | 3.4 | 6 | 9.3 | 24 | 3B | B | M | NE | NE |
| | 80 | 35.0 | 18.0 | 41.4 | 5.6 | 5 | 9.4 | 208 | 3B | B | SM | Coating peeled | |
| SC [6] | | 33.4 | 15.4 | 47.0 | 4.2 | 7 | 9.1 | 286 | 6B | | M | Coating peeled | |

[1] Seconds, bubble rise in Gardner tube.
[2] 0.06% cobalt metal based on resin solids.
[3] 50 rubs on film surface with xylene dampened cloth. NE=no effect; M=marred; SM=slightly marred.
[4] Deionized water immersion—65 hours at room tempeature.
[5] 2% tetrasodium pyrophosphate solution immersion for 4 hours.
[6] Styrene-allyl alcohol copolymer soya ester-maleic anhydride adduct.

EXAMPLE IV

Water-dispersible coating compositions and air drying performance (Series III)

The two best performing systems were tested in a third series using the third preparation of soyamide (Series III). These systems included hydroxyethyl soyamide 100% half-esters of styrene-maleic anhydride copolymers A and B. The hydroxyethyl soyamide 80% half-ester of styrenemaleic anhydride copolymer A was included as a check against the results of the immersion tests. The results in Table VII were based on half-esters prepared from the third batch of soyamide (Series III). Again concentrates were made from freshly prepared half-esters.

Forty-one and eight-tenths grams of 80% concentrate in butyl "Cellosolve" of hydroxyethyl soyamide 100% half-ester of styrene-maleic anhydride copolymer B was mixed thoroughly with 7.7 g. of butyl "Cellosolve," 4.4 g. of 30% ammonium hydroxide, and 46.1 g. of water. The final pH was in the range of 9.4 to 9.6. The final compositions of the dispersions were made nearly identical to the dispersion of the styrene-allyl alcohol copolymer soya ester-maleic anhydride adduct.

The results in Table VII show conclusively the superior performance of the hydroxyethyl soyamide 100% half-esters of styrene-maleic anhydride copolymers A and B over that of the commercial styrene-allyl alcohol copolymer soya ester maleic anhydride adduct. Water dilutability was excellent, xylene rub unaffected and essentially no chemical deterioration in water or alkali took place. The excellent air drying ability remains unchanged.

The viscosity was reported as the time required for a single air bubble to rise vertically a four inch distance in a Gardner tube. The color was measured against a 1953 series Gardner color scale.

For air drying tests all dispersions were catalyzed with a commercial water dispersible cobalt paint dryer ("Advacar" cobalt) 0.06% cobalt based on the weight of resin. Catalyzed samples were aged one day and subsequently drawn down with a 3 mil Bird applicator bar on glass plates. Immersion tests were carried out by immersing a two inch length of coated surface in an open 8 oz. jar.

What is claimed:

1. A water-dispersible, air-drying, partial ester of a low molecular weight copolymer of an alpha, beta-ethylenically unsaturated dicarboxylic acid and a vinyl benzene hydrocarbon which is esterified in the range of about 25% to 100% half-ester with an alkanolamide of an ethylenically-unsaturated, long chain fattey drying acid, said half-ester having remaining unesterified groups which are salt-forming carboxyl groups, and said copolymer prior to esterification having a molar ratio of polymerized vinyl benzene hydrocarbon to polymerized dicarboxylic acid of about 1:1 to 5:1 and having an average molecular weight in the range of about 500 to 5000.

2. A coating composition comprising the water-dispersible, air-drying, partial ester of claim 1 dispersed in water containing ammonium hydroxide.

3. A water-dispersible, air-drying, partial ester of claim 1 wherein said alpha, beta-ethylenically unsaturated dicarboxylic acid is maleic acid and said copolymer is esterified in the range of about 90% to 100% half-ester.

4. A water-dispersible, air-drying, partial ester of claim 1 wherein said vinyl benzene hydrocarbon is styrene and said copolymer is esterified in the range of about 90% to 100% half-ester.

5. A water-dispersible, air-drying, partial ester of claim 1 wherein said low molecular weight copolymer is styrene-maleic anhydride copolymer which is esterified in the range of about 90% to 100% half-ester.

6. A coating composition comprising the water-dispersible, air-drying, partial ester of claim 5 dispersed in water containing ammonium hydroxide.

7. A coating composition of claim 6 containing an organic co-solvent dispersed therein.

8. A water-dispersible, air-drying, partial ester of claim 1 wherein said low molecular weight copolymer is styrene-maleic anhydride copolymer which is esterified in the range of about 90% to 100% half-ester with an alkanolamide of ethylenically unsaturated soya fatty drying acid.

9. A water-dispersible, air-drying, partial ester of claim 1 wherein said copolymer is styrene-maleic anhydride copolymer which prior to esterification contains a molar ratio of polymerized styrene to polymerized anhydride of about 1:1 to 2:1 and has an average molecular weight in the range of about 1,000 to 2,500.

TABLE VII.—STYRENE-MALEIC ANHYDRIDE SOYAMIDE HALF-ESTERS DISPERSIONS AND AIR DRYING PERFORMANCE (SERIES III)

| Styrene-maleic anhydride copolymer | Half-ester level, percent | Composition of dispersion, weight percent | | | | | pH | Vis., secs. Gardner tube | Dilutability [1] | Pencil hardness on films dried 4 days | Immersion of air dried films | |
|---|---|---|---|---|---|---|---|---|---|---|---|---|
| | | NVM | Butyl "Cellosolve" | Ammonium hydroxide | Water | | | | | | Water, 50 hrs. | 2 percent TSPP, 2 hrs. |
| B | 100 | 33.4 | 16.1 | 4.4 | 46.1 | 9.6 | 79 | Very good | B | No effect | No effect (soften). |
| A | 100 | 33.3 | 16.7 | 4.2 | 45.8 | 9.4 | 60 | Excellent | B | do | Do. |
| | 80 | 30.8 | 16.3 | 5.0 | 47.9 | 9.5 | 36 | do | 3B | Wrinkled peeling | Wrinkled peeling soften. |
| SC [2] | | 33.4 | 15.4 | 4.2 | 47.0 | 9.1 | 286 | Fair | 5B | Spots in 25 minutes | Wrinkled peeled. |

[1] Dilutability was measured by stirring one part water into three parts of dispersion. Excellent means no turbidity formed; very good—some turbidity; fair—turbidity requiring extra butyl "Cellosolve" to clarify.
[2] Styrene-allyl alcohol copolymer soya ester-maleic anhydride adduct.

10. A water-dispersible, air-drying, partial ester of claim 9 wherein said low molecular weight styrene-maleic anhydride copolymer is esterified in the range of about 90% to 100% half-ester with the ethanolamide of ethylenically unsaturated soya fatty drying acid.

11. A coating composition comprising the water-dispersible, air-drying, partial ester of claim 10 dispersed in water containing ammonium hydroxide.

12. A coating composition of claim 11 containing an organic co-solvent dispersed therein.

13. A coating composition of claim 12 wherein said organic co-solvent is ethylene glycol monobutyl ether.

References Cited

UNITED STATES PATENTS

| | | | |
|---|---|---|---|
| 3,446,783 | 5/1969 | Kay et al. | 260—29.6 X |
| 3,428,588 | 2/1969 | Skoultchi et al. | 260—29.6 X |
| 3,425,977 | 2/1969 | Skoultchi et al. | 260—29.6 |
| 3,396,135 | 8/1968 | Bishop | 260—29.6 |
| 3,395,131 | 7/1968 | Fallwell | 260—29.6 X |
| 3,369,983 | 2/1968 | Hart et al. | 204—181 |
| 3,293,201 | 12/1966 | Shahade et al. | 260—23 |

FOREIGN PATENTS

| | | |
|---|---|---|
| 615,665 | 1/1949 | Great Britain. |
| 256,766 | 3/1949 | Switzerland. |
| 256,764 | 3/1949 | Switzerland. |

DONALD E. CZAJA, Primary Examiner

C. W. IVY, Assistant Examiner

U.S. Cl. X.R.

260—23, 33.2, 78.5, 404

UNITED STATES PATENT OFFICE
CERTIFICATE OF CORRECTION

Patent No. 3,528,939     Dated September 15, 1970

Inventor(s) Richard J. Pratt, Roger H. Jansma & Robert J. Conboy

It is certified that error appears in the above-identified patent and that said Letters Patent are hereby corrected as shown below:

Column 2, line 29, "p-cumene" should be --p-cymene--.

Column 4, line 2, "50" should be --25--.

Column 4, line 5, "given" should be --give--.

Column 5, line 58, "165.4" should be --165.1--.

Column 6, lines 15 to 20, the table should read as follows:

| Styrene Maleic Anhydride Copolymer | A | B | C | D |
|---|---|---|---|---|
| Mole Ratio Styrene to Maleic Anhydride | 1:1 | 2:1 | 3:1 | 1:1 |
| Equivalent Weight | 222 | 306 | 438 | 248 |
| Molecular Weight approximate | 1450-1600 | 1650-1700 | 1600-1900 | 600-700 |

Column 6, line 70, "coaoting" should be --coating--.

Column 7, line 5, "syrene" should be --styrene--.

Column 7, line 24, "alchool" should be --alcohol--.

UNITED STATES PATENT OFFICE
CERTIFICATE OF CORRECTION

Patent No. 3,528,939　　　　　　　　Dated September 15, 1970

PAGE - 2

Inventor(s) Richard J. Pratt, Roger H. Jansma & Robert J. Conboy

It is certified that error appears in the above-identified patent and that said Letters Patent are hereby corrected as shown below:

Column 7, Table IV, under the heading "NVM",
　　"33.7" should be --33.4--.

Column 8, Table IV, under the heading "Initial"
　　"386" should be --286--.

Column 10, line 19, "fattey" should be --fatty--.

Signed and sealed this 10th day of August 1971.

(SEAL)
Attest:

EDWARD M. FLETCHER, JR.　　　　　　WILLIAM E. SCHUYLER, JR.
Attesting Officer　　　　　　　　　Commissioner of Patents